US010623707B2

(12) United States Patent
Greenberg

(10) Patent No.: US 10,623,707 B2
(45) Date of Patent: Apr. 14, 2020

(54) IMAGE PROJECTION SYSTEM

(71) Applicant: EYEWAY VISION LTD., Or Yehuda (IL)

(72) Inventor: Boris Greenberg, Tel Aviv (IL)

(73) Assignee: EYEWAY VISION LTD., Or Yehuda (IL)

(*) Notice: Subject to any disclaimer, the term of this patent is extended or adjusted under 35 U.S.C. 154(b) by 67 days.

(21) Appl. No.: 15/780,758

(22) PCT Filed: Nov. 29, 2016

(86) PCT No.: PCT/IL2016/051275
§ 371 (c)(1),
(2) Date: Jun. 1, 2018

(87) PCT Pub. No.: WO2017/094002
PCT Pub. Date: Jun. 8, 2017

(65) Prior Publication Data
US 2018/0367769 A1 Dec. 20, 2018

(30) Foreign Application Priority Data
Dec. 3, 2015 (IL) .......................................... 242895

(51) Int. Cl.
*H04N 7/18* (2006.01)
*H04N 9/31* (2006.01)
(Continued)

(52) U.S. Cl.
CPC .......... *H04N 9/3173* (2013.01); *G02B 26/10* (2013.01); *G02B 27/0093* (2013.01);
(Continued)

(58) Field of Classification Search
CPC ...................................................... H04N 9/3173
(Continued)

(56) References Cited

U.S. PATENT DOCUMENTS 5,615,683 A * 4/1997 Toge .................... A61B 3/1233
600/479
8,922,898 B2 12/2014 Legerton et al.
(Continued)

FOREIGN PATENT DOCUMENTS

TW       201537218 A    10/2015
WO    2015/132775 A1    9/2015

OTHER PUBLICATIONS

Office Action of the Taiwanese counterpart application issued Jan. 6, 2020.

*Primary Examiner* — Leron Beck
(74) *Attorney, Agent, or Firm* — Browdy and Neimark, PLLC

(57) ABSTRACT

A system (100) for use in retinal image projection comprising at least first (130) and second (140) image projecting units and an eye projection optical module (120). The projecting units (130, 140) are configured to project at least first and second image portions respectively. The eye projection optical module (120) is optically coupled to the image projecting units (130, 140) and is configured to combine optical paths of projection of the at least first (130) and second (140) image projecting units along a general optical path to project a combined image of the first and second image portions on a retina (12, 14) of a user's eye (10).

21 Claims, 6 Drawing Sheets

(51) Int. Cl.
 G02B 27/01 (2006.01)
 G02B 26/10 (2006.01)
 G02B 27/00 (2006.01)
(52) U.S. Cl.
 CPC ..... *G02B 27/0172* (2013.01); *G02B 27/0179* (2013.01); *H04N 9/317* (2013.01); *H04N 9/3129* (2013.01); *H04N 9/3147* (2013.01); *G02B 2027/014* (2013.01); *G02B 2027/0187* (2013.01)
(58) Field of Classification Search
 USPC .......................................................... 348/78
 See application file for complete search history.

(56) References Cited

U.S. PATENT DOCUMENTS

| | | | |
|---|---|---|---|
| 2001/0043163 | A1 | 11/2001 | Waldern et al. |
| 2005/0185281 | A1 | 8/2005 | Perlin et al. |
| 2006/0072209 | A1* | 4/2006 | Karasawa ........... G02B 27/0025 359/651 |
| 2008/0002262 | A1 | 1/2008 | Chirieleison |
| 2009/0189830 | A1 | 7/2009 | Deering et al. |
| 2012/0105310 | A1 | 5/2012 | Sverdrup et al. |
| 2012/0257282 | A1* | 10/2012 | Hudman ................... G02B 5/04 359/619 |
| 2015/0178939 | A1 | 6/2015 | Bradsk et al. |
| 2016/0143527 | A1* | 5/2016 | MacDougall ........... A61B 3/113 345/8 |
| 2016/0377865 | A1* | 12/2016 | Alexander ........... G03H 1/2645 345/8 |

* cited by examiner

IMAGE PROJECTION SYSTEM

TECHNOLOGICAL FIELD

The present invention is in the field of image projections systems and is particularly related to wearable/head mounted retinal projection systems for providing a pure, augmented or virtual reality experience to users.

BACKGROUND

Head mounted or generally wearable image projection systems are used for providing virtual and/or augmented reality experience by displaying images directly into users' eyes. Various types of head mounted projection systems are known utilizing image projection in front of or into the eyes of a user. Such projection systems are in many cases configured as glasses mountable onto a user's head and operable for projecting images onto the user's eyes for providing true and convincing display.

Similar to standard display systems, head mounted display systems aim to provide high resolution images while utilizing limited computational power. To simplify image rendering complexity, certain retinal/foveal display systems have been developed, utilizing separate image projections for the foveal region of the user's eye, and an additional, lower resolution image projection directed to the peripheral regions of the retina to provide a wide field of view.

US2008002262 discloses a head mounted display device which has a mount which attaches the device to a user's head, a beam-splitter attached to the mount with movement devices, an image projector which projects images onto the beam-splitter, an eye-tracker which tracks a user's eye's gaze, and one or more processors. The device uses the eye tracker and movement devices, along with an optional head-tracker, to move the beam-splitter about the center of the eye's rotation, keeping the beam-splitter in the eye's direct line-of-sight. The user simultaneously views the image and the environment behind the image. A second beam-splitter, eye-tracker, and projector can be used on the user's other eye to create a stereoptic, virtual environment. The display can correspond to the revolving ability of the human eye. The invention presets a high-resolution image wherever the user looks.

US 2012/0105310 describes a head mounted display system with at least one retinal display unit having a curved reflector positioned in front of one eye or both eyes of a wearer. The unit includes a first set of three modulated visible-light lasers co-aligned and adapted to provide a laser beam with selectable color and a first scanner unit providing both horizontal and vertical scanning of the laser beam across a portion of the curved reflector in directions so as to produce a reflection of the color laser beam through the pupil of the eye onto a portion of the retina large enough to encompass the fovea. The unit also includes a second set of three modulated visible-light lasers plus an infrared laser, all lasers being co-aligned and adapted to provide a color and infrared peripheral view laser beam, and a second scanner unit providing both horizontal and vertical scanning of the visible light and infrared laser beams across a portion of the curved reflector in directions so as to produce a reflection of the scanned color and infrared laser beams through the pupil of the eye onto a portion of retina corresponding to a field of view of at least 30 degrees×30 degrees.

US 2005/185281 describes an apparatus for viewing which includes a screen. The apparatus includes means for detecting a fixation point of a viewer's eyes on an image on the screen. The apparatus includes means for displaying a foveal inset image of the image on the screen about the fixation point so a viewer's fovea sees the foveal image while the rest of the eye sees the image. The method includes the steps of detecting a fixation point of a viewer's eyes on an image on a screen. There is the step of displaying a foveal inset image of the image on the screen about the fixation point so the viewer's fovea sees the foveal image while the rest of the eye sees the image.

US 2009/189830 describes a display device which is mounted on and/or inside the eye. The eye mounted display contains multiple sub-displays, each of which projects light to different retinal positions within a portion of the retina corresponding to the sub-display. The projected light propagates through the pupil but does not fill the entire pupil. In this way, multiple sub-displays can project their light onto the relevant portion of the retina. Moving from the pupil to the cornea, the projection of the pupil onto the cornea will be referred to as the corneal aperture. The projected light propagates through less than the full corneal aperture. The sub-displays use spatial multiplexing at the corneal surface.

GENERAL DESCRIPTION

There is a need in the art for a novel configuration of a display system providing retinal image projection having desirably high image/projection quality with given image rendering power.

In conventional projection systems the maximal image resolution is generally limited by several factors: image generating element (projecting unit), processing power provided by the control unit, e.g. graphic processing unit (GPU), and bandwidth of data transmission from the GPU to the projecting unit(s). Thus, providing image projection, having pixel density equivalent to spatial resolution of human vision utilizing conventional eye projection systems, requires both extremely high computing power and may typically require an array of small projecting/display units.

More specifically, providing imaging with maximal human eye resolution may typically require projection of image frames containing about 20 megapixels or more for each eye. Additionally, to provide temporal resolution matching to that of human perception (so that image movements are perceived as smooth and seamless), the displayed images may need to be rendered at rates of 60 HZ or more. This requires high rates of image rendering and of data transfer between the control unit and the projecting unit(s), and between a storage utility and the control unit (e.g. in the order of 28 GBit/second considering projection of images with color depth of 24 bit color). Such high data transfer rates are generally beyond the capabilities of state of the art eye projection devices, and in any case, might increase the systems' weight, size, cost and energy consumption.

The present invention provides a novel image projection system which utilizes two or more image projection modules/units to project image(s) with spatially varying image projection quality onto the retina. In this regard, the phrase image projection quality is used herein to refer to the pixel density (e.g. DPI or dots per unit solid angle) of the image projection onto the retina, and possibly also onto the color depth level in the projected image. To this end, in some embodiments the two or more projection modules provide image portions having respectively two or more levels of color depth.

In certain embodiments, the technique of the present invention utilizes projection of high pixel density image portions, i.e. having high angular resolution and equivalently high number of dots per inch (DPI) on the projected surface, onto the fovea region of a user's eye and projection of image portions with lower pixel density (lower angular-resolution/DPI) onto the periphery of the user's retina (e.g. the parafoveal region). This provides effective high resolution perception of the projected image by the user's eye, while reducing image rendering, data transmission and storage needs of the projection system. Thus, high pixel density image(s) are provided to retina regions (fovea) which are capable of collecting the image details and translating them to the user's brain, while image(s) of lower pixel density (angular resolution) are provided to regions (parafovea) of the retina having lower perception abilities.

Similarly, certain embodiments of the present invention take advantage of the fact that the perception of color depth is much more eminent in the foveal region of the eye retina, than in other (parafoveal) regions. In those embodiments, image portions that are projected on the fovea, are projected with higher color depth than image portions that are projected on the periphery.

Thus, according to certain embodiments of the present invention, certain portions of the image are projected with high image projection quality (high angular resolution and/or high color depth) on certain regions of the retina (i.e. on the fovea) that are capable of perceiving projected images with high DPI and/or with high color depth, and certain other portions of the image are projected with lower image projection quality on regions of the retina, where perception is limited to lower DPIs and/or to lower color depth (e.g. peripheral/parafoveal regions of the retina).

Accordingly, some embodiments of the present invention utilize two or more image projection modules/units, having different, respectively wide and narrow, angular spread. The image projection module, with the narrow angular spread (e.g. covering solid angle of 3° to 10° along each of the horizontal and the vertical axes) is configured and operable to project images of higher image projection quality (higher angular-resolution/DPI and/or higher color depth) on the central (fovea) region of the retina so that the user can perceive high quality images. The image projection module, with wide angular spread (e.g. covering solid angle of between 60° and 170° along each of the horizontal and vertical axes), is configured for projection of image portions with lower image projection quality on the periphery of the retina (e.g. the so called parafoveal area). This allows to exploit the anatomical properties of the human eye, to project an image with perceived high quality thereto, while reducing the amount of data and processing requirements, and/or the size/weight and/or cost of the system, which would have been required in cases where the image would have been projected with the same high quality uniformly across the retina.

Accordingly, the technique of the present invention dramatically reduces data transfer and processing requirement of the eye projection system, while maximizing user experience from the projection system (the user still perceives high resolution images through regions of the retina capable of doing so).

As is known, the retina's inner coating of the human eye has light sensitive tissue. A region of the retina called the fovea is responsible for sharp vision, having a high density of cone-type photosensitive nerve cells. To this end, the technique of the present invention utilizes high resolution images directed at the user's fovea while providing peripheral images directed at the retina and having lower image resolution to reduce rendering complexity while maintaining a large field of view. Therefore, the technique of the invention focuses image projection with high resolution at the fovea, and provides projection with lower resolution, thus providing high resolution projection with reduced processing and data transmission requirement as compared to uniform pixel density rendering.

The eye projection system of the present invention includes an optical module configured to direct images (i.e. also referred to herein as image portions) from at least two (e.g. first and second) image projecting units into the user's eye (i.e. at least into one eye). The optical module is configured to direct an image portion provided from a first projection unit into a first region of the user's eye (fovea), and an image portion projected by other projection unit(s) (e.g. the second projection unit, or additional ones, if used) to surrounding/peripheral regions of the retina (parafovea).

According to some embodiments, the optical module may generally comprise a combining unit (e.g. beam combiner), and a relay unit (optical relay), which may be arranged in cascading order along an optical path of the optical module to direct image projections from the image projection units and project them in combination (simultaneously or not) into the user's eye. More specifically, the combining unit combines light beams associated with the projected image portions generated by the at least first and second projection units into a combined optical field representing the full projection image frame(s) that should be provided/projected to the user's eye. Here the phrase optical field and combined optical field are used to designate the intensity profile and possibly the chromatic content of light measured across the optical path of image projection towards the eye. The light beams forming the combined optical field may be transmitted from the combining unit to the optical relay, which directs the optical field to the user's eye.

More specifically, in some embodiments, the optical relay is configured to relay to the optical field such that it is directly projected on the retina. Examples of configurations and methods of operation of such optical modules including such relays which are configured and operable for direct projection of images onto the eye retina, and which may be incorporated in the optical module of the present invention, are described for example in PCT patent publication No. WO 2015/132775 and in IL patent application No. 241033, both co-assigned to the assignee of the present patent application and incorporated herein by reference.

In this connection, it should be understood that the term direct projection as used hereinbelow relates to projection of an optical field such that the propagating optical field is focused to an image plane on the user's retina. For instance, the optical module and/or the optical relay thereof may be configured such that the light beams of the optical field arrive at the eye lens such that they are substantially collimated and/or so that they are focused on the retina by the eye lens itself. Alternatively or additionally, such direct projection may be achieved by projecting the light field towards the retina such that its cross-section diameter is substantially (e.g. twice or more) smaller than the entrance pupil of the eye (to thereby obtain high depth of field of the image projection on the retina).

In some embodiments the optical module includes a trajectory module (e.g. moveable or rotatable light deflector(s) for instance presenting a gaze tracking optical deflector and/or pupil position optical deflector such as those described in IL patent application No. 241033), which is configured and operable for adjusting the optical path of the image projection in accordance with line of sight (LOS) of the user's eye. To this end the system may utilize, and/or may include, an eye tracking unit configured to detect the LOS of the user's eye and/or variation in gaze direction, and provide corresponding data to the trajectory module to vary orientation of the general optical path to determine deflection of optical path provided by the trajectory module. Accordingly, the image(s) (optical field) may be projected by the system along the general optical path that changes in accordance with changes in the orientation of the line of sight (LOS) of the eye, and/or changes in the pupil's/eye's position relative to the eye projection system. To this end, the trajectory module may be configured to vary the general optical path of light propagation along the optical module in accordance with orientation of the user's eye relative to the eye projection system (e.g. in accordance with the direction of the optical-axis/line-of-sight (LOS) of the eye). Examples of such an optical system including an optical relay, and eye tracking optical deflectors (e.g. pupil position beam deflector and gaze direction beam deflector), which can be used to direct image projection to the eye retina while the eye's position and its gaze direction may vary with respect to the eye projection system, are described for instance in IL patent application No. 241033 which is co-assigned to the assignee of the present patent application and incorporated herein by reference.

To this end, with the use of the trajectory module, eye tracking unit and the optical relay unit, the optical path of the optical module can be varied such that the optical field combined with the two or more image portions, may be transmitted along the general optical path towards the user's pupil. The projected light field can be directed to arrive at the pupil's location from a variety of angular orientations, such that the user's eye may form the combined image on the proper location on the retina, while the user may change his gaze direction and/or while the relative displacement between the eye projection system and the eye changes. As described above, the optical field is configured such that an image portion generated by the first projection unit forms a portion of the image on a selected part of the retina (i.e. the fovea) and image portions generated by the one or more second projection units form portion(s) of the image on other regions of the retina (parafoveal). Further, the location of the generated image portion(s) on the retina may be kept fixed, even if the user shifts his gaze direction.

Thus, optical relay (also referred to herein as a relay unit) is generally configured to generate an image on the user's retina such that image portions provided by the first projecting unit are generated on the fovea region of the retina and image portions provided by the other projecting unit(s) is/are generated on the parafoveal region of the retina, being at the periphery of the retina.

It should be noted that the first and second image projection units may generally have different properties. For instance, in order to project the different fields of view, the image projection units may be configured and operable for outputting towards the optical modules light rays/beams spanning different angular extents. Also they may be configured to output images with different angular resolutions and/or different color depth. For instance the first image projection unit may be adapted to provide RGB images (image portions) with high angular resolution and high color depth, and the second image projection unit may be adapted to provide RGB image portions with lower color depth, or in some case monochromatic, and/or image portions with lower angular resolution. Variation in color depth may be such that the first projection unit provides image with color depth of e.g. 32 bit or 24 bit and the one or more second projection units provide images with color depth of e.g. 16 bit or 8 bit.

To this end, in some cases the first and second image projection units may be configured based on different technologies. For instance, the first image projection unit may be configured as a scanning image projection whose outputted image is produced by scanning (e.g. rastering) light rays over the angular extent through which the image is outputted while modulating the intensity and possibly the color content of the light rays to create, and output towards the optical module, a first optical field encoding an image (image portion) generated thereby. Using scanning based image projection may be advantageous in terms of power and intensity over non scanning based (e.g. SLM based) projection units. The second image projection unit may be configured as either a scanning image projection system as described above, or as an area image projection system utilizing one or more spatial light modulators (SLMs; such liquid crystal array and/or micro-mirror array) to simultaneously modulate the intensities and possible chromatic content of the plurality of pixels projected thereby. Examples of configurations and operations of image projection units using raster scanning and/or spatial light modulation to form images are generally known in the art of image projection, and the principles of their configurations and operations need not be described herein in detail.

It should be noted that according to the present invention the first and second image projection units are configured and operable such that they are capable of respectively outputting two, first and second, complementary image portions (optical fields) which spatially complement one another to form projection of a continuous image on the surface of the retina. To this end, the first image projection unit may be adapted to project an image covering a certain angular/lateral extent about the general optical axis of the optical module such that when it is directed to the retina it falls on the foveal region thereof. The second image projection system may be configured and operable to cover a wider angular/lateral field extending about the general optical axis, while optionally spanning/covering an annular (or more generally frame or donut like region) about the general optical axis of the optical module, so that when an image portion created thereby is directed to the retina, it falls at least on the periphery of the retina.

In this regard the first and second image projection units are configured to generate image portions that spatially complement one another (e.g. such that they overlap or have a common boundary) to enable the optical module to appropriately combine the resulting optical fields (image portions). The resulting combined optical field corresponds to the foveal image portion at a central region (at an image plane) thereof and parafoveal image portion at a peripheral portion thereof (at an image plane), providing together a spatially continuous image having substantially smooth transition between the image portions. To achieve this, the first and second image projections are arranged in the eye projection system such that the image portions outputted and combined by the combiner unit propagate with the spatial registration relative to one another along the optical path of the optical module.

It should be noted that in some embodiments of the present invention the second image projection unit is configured and operable such that lateral/angular extent of the second (e.g. annular) image portion (optical field) which is outputted thereby to propagate along the optical path of the optical module, spatially overlaps the first (e.g. central) image portion (optical field), which is outputted by the first projection unit to propagate along the optical path. To this end, some overlap between the first and second image portions, at least along the periphery (annular boundary) of the first image portion may be used to provide smooth and seamless transition between the high quality of the first image portion and the lower quality of the second image portion.

This technique of the present invention reduces rendering processes by directing the required computing power to generate high resolution images for the center field of view corresponding to the regions on which the user is fixating. The periphery of the image and of the user's field of view may be rendered and projected at lower resolution. This is since the parafoveal part of the projected image is at the periphery of the user's attention and is captured by the parafoveal region (herein referred to as the retina in general) of the user's eye where the photoreceptor cells are of lower density and provide data with reduced spatial density and lower resolution.

It should be noted that as the images directed into the user's eye are generally rendered in accordance with the orientation of the eye, and transmission of the image/light field is adjusted by the eye tracking unit, the user can experience complete virtual reality (or augmented reality) perceiving a large field of view (with effectively no image boundaries) providing a sense of presence to the user.

Thus according to a broad aspect of the invention, there is provided a system for use in retinal image projection comprising:

at least a first and a second image projection unit configured and operable for projection of at least a first and a second image portion respectively; and an eye projection optical module optically coupled to the at least first and second image projecting units and configured and operable to combine optical paths of projection of the at least first and second image projection units along a general optical path along which to light beams from said first and a second image projection units, associated with projection of said projection of said first and a second image portions respectively, are to be directed to propagate towards a user's eye to project a combined image comprising said first and second image portions on the retina.

According to some embodiments, the first and second image projection units and said eye projection optical module may be configured and operable such that the first image portion, projected by the first image projection unit, is directed onto a first, central, region on a retina of the user's eye, and the second image portion projected by the second image projection unit is directed onto a second, annular, region at the periphery of the retina.

In some embodiments, the second image projection unit may be configured to project the second image portion with an angular extent larger than an angular extent of the first image portion projected by the first image projection unit.

In some embodiments, the first image projection unit may be configured to project the first image portion, on a first, central, region of the retina, such that it covers a foveal region of the retina and the second region covers at least a portion of a parafoveal region of the retina surrounding said foveal region.

The first and second projection units may further be configured and operable to allow projection of image portions of relatively higher image projection quality on the foveal region of the retina and image portions of relatively lower image projection quality on peripheral regions of the retina. The image projection quality may be associated with at least one of the following: angular resolution, and color depth, of the image projection.

According to some embodiments, at least one of the first and second image projection units may be a scanning based image projecting unit configured and operable for projecting images by scanning an image encoded light beam on the retina.

According to some embodiments, the system may further comprise a control unit associated with an eye tracking module configured and operable for detecting changes in a gaze direction of the eye; and wherein said eye projection optical module comprises a trajectory module configured and operable for adjusting a general optical path of the image projection towards the eye; said control unit is adapted to operate said trajectory module in accordance with detected changes in the gaze direction.

The eye tracking module may be configured and operable for detecting changes in a lateral location of a pupil of the eye relative to the system, and said control unit is adapted to operate said trajectory module in accordance with detected changes in said lateral location of the pupil.

The control unit may be configured and operable for operating said trajectory module to compensate for said detected changes and thereby maintain the combined image projected at a fixed location on the retina.

According to some embodiments, said eye projection optical module is configured to direct the input light into the user's eye and toward the retina through the pupil such that a cross section of the light field (e.g. at full width half max, or at 25% intensity) is smaller than the user's pupil. This provides an eye-box having diameter smaller with respect to the user's pupil. The eye projection optical module may be configured for varying at least one of location and angle of the eye-box in accordance with data on the gaze location of the user's pupil received from the eye tracking module, to thereby align said exit pupil with the optical axis of a user's eye.

According to yet another embodiment, the system may also comprise a control unit, configured and operable for obtaining imagery data indicative of a content of combined image that should be projected to the user's eye, and segmenting said imagery data to said at least first and second image portions such that the first and second image portions are complementary image portions projectable by said first and second image projection units on to the central and periphery regions of the retina to thereby project said combined image on the retina.

The optical projection module may comprise an optical combining element configured to combine image projection of the first and second image projection units such that a first optical field generated by the first image projecting unit and associated with the projection of said first image portion propagates along a central region of a plane perpendicular to an optical axis of said optical projection module and second optical field generated by the second projecting unit propagates at a peripheral region of said plane with respect to said central region.

According to some embodiments, the system may be configured and operable such that said first optical field propagating along the central region is projected towards the eye such that it covers a central part of the field of view of the eye thereby providing image projection to the foveal region of the retina, and said second optical field which propagates at the periphery of the optical path covers an annular region of the field of view, thereby providing image projection to the parafoveal region of the retina.

The first and second optical fields may be projected with respectively higher and lower image projection quality, and the second projecting unit is configured to provide image projection onto a donut-shaped field of view thereby providing image projection to the parafoveal region.

Additionally or alternatively, the first and second optical fields may overlap at a boundary region between said central and peripheral regions thereby providing projection of overlapping parts of the first and second image portions in the boundary region. The first and second image portions may be registered such that said overlapping parts projected by the first and second image projection units correspond to the similar image content.

According to some embodiments, the system may be configured such that each of said at least first and second projecting units is configured to provide output light corresponding to image being projected with projection angle range $\alpha_{max}$, said optical projection module being configured to relay said output light towards a user's eye such that images projected by said first and second projecting unit enter said user's pupil at angular ranges $\alpha^1_{in}$ and $\alpha^2_{in}$ respectively, and $\alpha^2_{in} > \alpha^1_{in}$. $\alpha^1_{in}$ may correspond to an angular range of 3°. $\alpha^2_{in}$ may correspond to an angular range greater than 20°.

According to some embodiments, the system may be configured for use in a head mounted display unit.

According to some embodiments, the system may be configured to provide virtual or augmented reality experience.

In some embodiments, the eye projection optical module may be configured to direct images projected by the first and second projecting units to the user's eye while blocking surrounding ambient light.

In some embodiments, the eye projection optical module may be configured to direct images projected by the first and second projecting units to the user's eye while allowing transmission of surrounding ambient light, thereby providing a transparent display.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
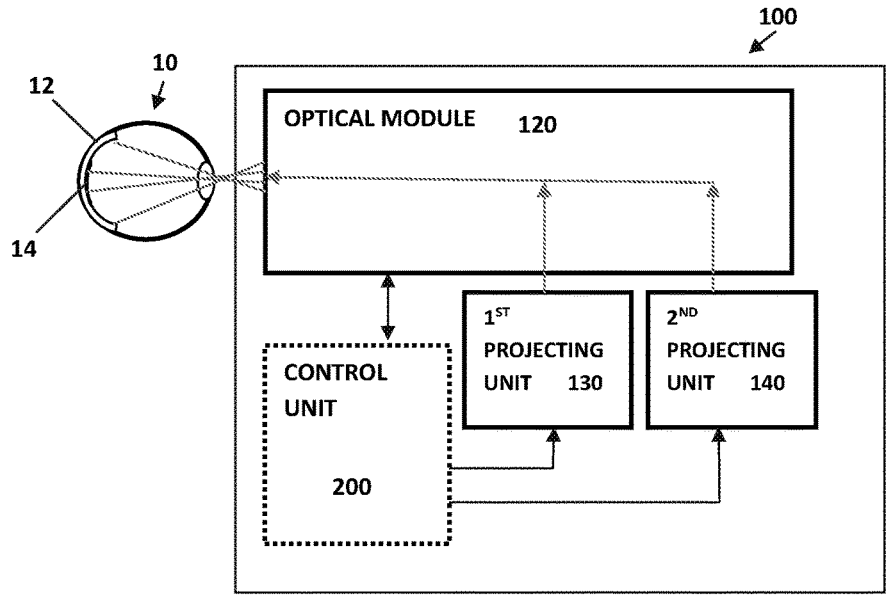
FIGS. 1A and 1B show schematic illustrations of an eye projection system and general control unit operations for operating the eye projection system according to the present invention.
Figure 1B:
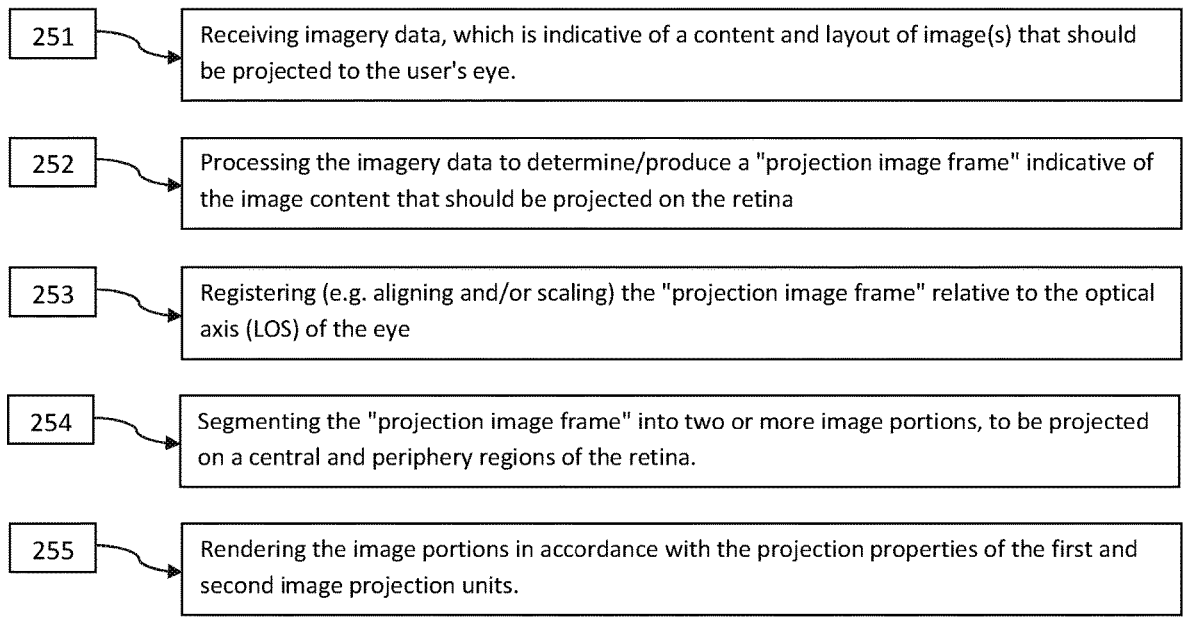

As indicated above, there is a need in the art for novel configuration of an eye projection system. Reference is made together to FIGS. 1A and 1B illustrating schematically eye projection system 100 and method 250 for projection of an image into a user's eye according to some embodiments of the present invention. The eye projection system 100 is configured to generate images and project the generated images into a user's eye 10. For simplicity, a single eye is shown in this illustration; however it should be understood that generally the image projections system 100 may be configured to project images to both the user's eyes, while allowing certain differences between the right eye images and the left eye images, to provide three dimensional experiences.

Eye projection system 100 includes at least first 130 and second 140 image projection units/modules (hereinafter also referred to as projection units), and an optical module 120 configured to direct light corresponding to images projected by the projection units into the user's eye 10 to form images on the user's retina 12. The system may generally also include, or be connectable to, at least one control unit 200. The control unit 200 is typically configured to render image data and transmit it to be projected by the first and second projection units 130 and 140.

To this end, rendering image data to be projected by the two or more (first and second) projection units 130 and 140 may include carrying out the operations of method 250 as described forthwith. The control unit 200 may be configured and operable for carrying out operation 251 for receiving imagery data indicative of the content of a "projection image frame" (also referred to herein as combined image) that should be projected to the user's eye. The imagery data may, for example, include a content and layout of image(s) that should be projected onto the retina (where the content may be information of one or more images that should be simultaneously projected onto the retina, and the layout may include information about the arrangement/layout of the projection of these one or more images). The layout data may include for example lateral positioning data indicative of the lateral position of the image(s) on the retina (e.g. data about an anchor point in the image(s) representing a point of intersection between the LOS of the eye and the image plane). The control unit 200 may be adapted to carry out optional operation 252 for processing the imagery data to determine/produce a "projection image frame" indicative of the combined optical field (image content) that should be projected onto the retina. For instance, in some cases the "projection image frame" is formed by concatenating a plurality of images that are included in the image data, while arranging them in the frame in accordance with the layout data. In optional operation 253, the control unit performs a registration operation to register the "projection image frame" relative to the optical axis (LOS) of the eye. In other words, registration/alignment data indicative of aligned position of the "projection image frame" is relative to the LOS of the eye (e.g. registration/alignment data may be indicative of a point in the "projection image frame" which should be intersected by the LOS axis of the eye).

In operation 254, the control unit 200 segments the "projection image frame" into two or more segments (image portions), which are to be projected by the two or more (first and second) image projection units, 130 and 140. At least one of the image projection units, e.g. 130, is adapted for projection of images (image portions) onto the central (foveal) region of the retina; and at least one other of the image projection units, e.g. 140, is adapted for projection of images (image portions) onto the periphery (parafoveal) region of the retina. Accordingly, in operation 254, the control unit 200 utilizes the registration/alignment data obtained in 253 and segments the "projection image frame" into at least two image portions, which are to be respectively projected by the first and second image projection units, 130 and 140, onto the foveal and parafoveal regions of the retina.

In this regard it should be noted that for carrying out such segmentation, the control unit may utilize projection unit configuration data which is indicative of the projection parameters, such as the numerical apertures (NAs), of the first and second image projection units, 130 and 140 (namely data about the regions of the retina which are covered by each of the projection units and their angular-extents). This allows the control unit 200 to properly segment and divide the "projection image frame" between image projection units, 130 and 140.

Figure 2:
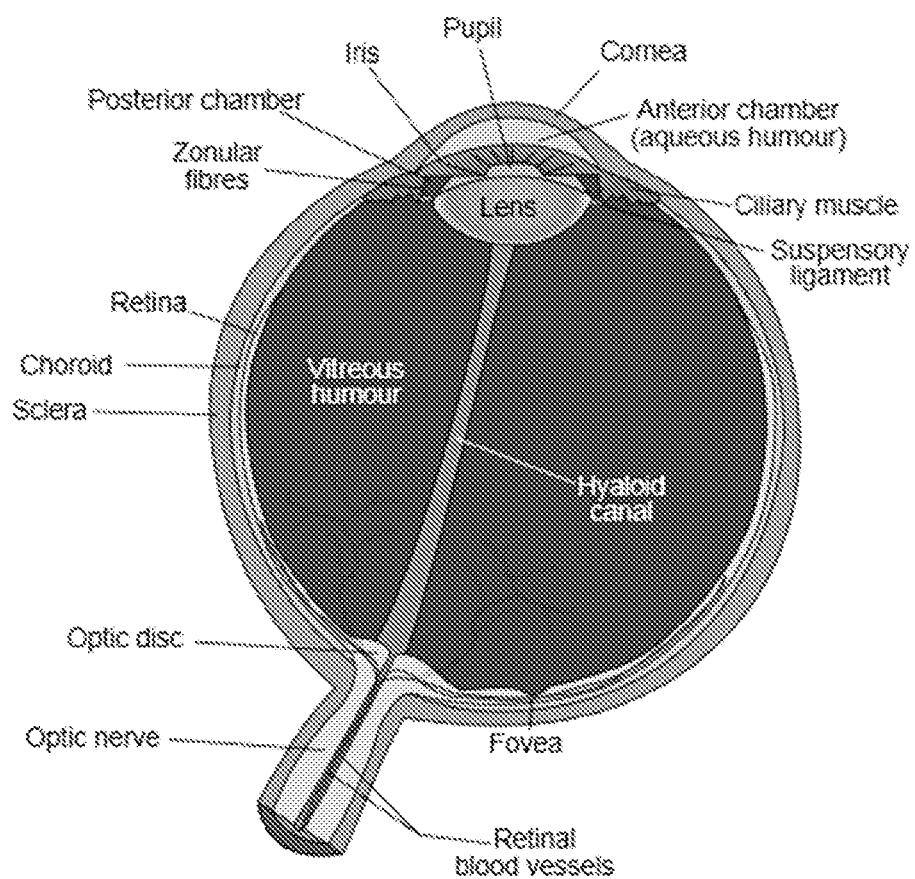
FIG. 2 shows a schematic illustration of a human eye.

In 255 the control unit 200 carries out rendering of the first and second image portions that are to be projected by the image projection units, 130 and 140, respectively. The control unit 200 may utilize the projection unit configuration data, which may be indicative of projection parameters such as angular resolution and color depths provided by the image projection units 130 and 140, to render the respective first and second image portions accordingly. In this regard, as indicated above, the first image projection unit 130, which is configured for projection of images to the foveal region of the retina, may be configured for projecting images on the retina with higher angular resolution (higher DPI) and/or with improved color depth, than the angular resolution (DPI) and/or the color depth provided by the second of the image projection units, 140, which projects images on a parafoveal region of the retina. Then in operation 256, the control unit provides rendering data indicative of the first and second image portions to the first and second image projection units, 130 and 140, for projection thereby. In this connection, the eye projection system 100 according to the present invention utilizes features of the anatomic structure of the human eye. Reference is made to FIG. 2 illustrating the anatomic structure of a human eye. As the structure of the human eye is generally known, it will not be described herein in detail, but its suffices to state that the retina (12 in FIG. 1) is the photosensitive region collecting light and generating data to be transmitted to the brain. The retina includes a plurality of photosensitive cells being sensitive to light intensity (black and white vision) and to wavelength (colour vision). More specifically, the retina includes rod type cells (rods) that are sensitive to luminosity (intensity of light) and cone type cells (cones) that are sensitive to chroma (colors or wavelengths). A region in the center of the retina includes greater concentration of cone cells (wavelength sensitive cells) and is known as the fovea (marked as 14 in FIG. 1). The fovea is in charge of providing detailed images of what is located at the center of the field of view, or the center of attention. Generally the foveal region provides higher spatial frequency or higher resolution, and possibly higher color sensing abilities, while the parafoveal region provides low resolution image perception (providing the brain with blurred indication on the periphery of the scene) and possibly lower color sensing abilities, while being more sensitive to movement and gradients within an input light field.

Accordingly, the image projection units 130 and 140 are configured and operable for projection of complementary portions of the combined optical field ("projection image frame") that is to be projected onto the retina. The first image projection unit 130 is configured and operable such that it can project a first image portion, which is to be directed to the foveal region of the retina, with high image projection quality (i.e. rendering/projecting the first image portion, such that it has a high angular resolution and/or high color depth). The second image projection unit is configured for projecting the second image portion (which is to be directed to the parafoveal region of the retina, with lower image projection quality (i.e. reduced angular resolution and/or reduced color depth as compared to those of the first image portion).

For instance the image projection unit 130 may be configured and operable for projecting certain portion(s) of the projection image frame with high angular resolution, which is about or below 4 arc-minute$^2$ of solid angle per pixel. The image projection unit 140 may be configured and operable for projecting certain portion(s) of the projection image frame with low angular resolution, which is about or above 10 arc-minute$^2$ of solid angle per pixel. In some embodiments the image projection unit 130 is configured for projecting its respective image portions with RGB color contents (e.g. with color depth of at least 8 bit (256 colors) or higher (e.g. 24 bit)). The image projection unit 140, which is used for projecting images onto the periphery of the retina, may be configured for projecting its respective image portions with lower color depths (e.g. 4 bit color depth (16 colors)) and/or with no, or minimal, color information (e.g. gray scale image).

To this end, according to some embodiments of the present invention the image projection unit 130 may be configured in a scanning image projection configuration, (by which an image is projected via scanning (raster scanning) a light beam temporally modulated with the image information, on the projection surface (namely on the respective foveal region of the retina). Such scanning image projection configuration of the image projection unit 130 facilitates achieving high quality image projections with compact dimensions of the image projection unit 130. The image projection unit 140 may be configured in either a scanning image projection configuration; and/or an aerial image projection technique, e.g. which utilizes a spatial light modulator to project its respective image portions onto the parafoveal regions of the retina.

The optical module 120 is configured to combine image portions projected by the at least first and second projecting units 130 and 140 and direct the corresponding light ray to form images projected into the user's eye 10 simultaneously. Additionally, the optical module is configured to direct images generated by different projecting units onto different regions (e.g. foveal and parafoveal regions) of the user's retina 12.

In this regard, it should be noted that according to some embodiments of the invention, in the segmentation operation 254 of method 250, the control unit 200 segments the "projection image frame" into two (or more) segments (first and second image portions), which have some overlap along a boundary region between them. Accordingly, in such embodiments, the first and second image projection units, 130 and 140, are configured and operable to project these first and second image portions onto the retina such that they overlap at the boundary area between them. Thus, on the boundary, similar image information is projected in an overlap and with respectively high and low image projection quality, by the first and second image projection units 130 and 140. The optical module 120 may be configured to combine image portions generated by the first 130 and second 140 projection units such that the overlap between the first and second image portions is maintained. Further, the optical module may be configured and/or operable to direct the projected image portions such that the boundary between the image portions substantially corresponds to the anatomical boundaries of the fovea in the user's retina. The system may include a setting parameter relating to relative size/angular-extend of the foveal image and boundary location for user's selection, or may be fixed to fit the anatomy of a majority of users. Overlapping between image portions is typically provided to facilitate perceived smooth transition between the higher quality of the image projected on the foveal region of the retina and the lower quality of the image portions projected on the parafoveal region(s) thereof, and/or to compensate for inaccuracies and anatomical variations between users.

The control unit 200 may also be responsive to eye tracking data (e.g. obtained from an eye tracking module such as that disclosed in IL patent application No. 241033) on eye 10 orientation and/or position, and provide appropriate commands to the optical module 120 to vary the general path of image projection in order to correct the optical path of image projection in accordance with the eye's 10 movements. For instance, the optical module 120 may include a trajectory module (e.g. such as 124 shown in FIG. 5) which may include for instance an adjustable gaze tracking beam deflector and/or an adjustable pupil position beam deflector (e.g. which may be configured and operable as described in IL patent application No. 241033). The control unit 200 may be configured and operable for adjusting positions of one or both of these deflectors to vary the general propagation path of image projection in accordance with the gaze direction (direction of the LOS) of the eye, and/or the relative lateral displacement and/or relative angular orientation between the optical axis of the eye and the output optical axis of the optical module 120; e.g. to maintain substantially fixed relative orientation and/or displacement between them. Indeed, when fixed relative orientation and displacement are maintained between the optical axis of the eye and the output optical axis of the optical module 120, the image(s)/image portions from the first 130 and second 140 projection units are projected at fixed location(s) on the retina.

Alternatively or additionally, in some embodiments, the control unit 200 may be configured and operable to compensate for some/slight changes/shifts in the relative orientation and/or displacement between the optical axes of the eye and the optical module 120, by operating the first and second projection units 130 and 140 to shift and/or warp the image projected thereby so that the projected optical field is shifted/warped in ways that counteract changes in the relative orientation/displacement. For instance, use of such a technique to compensate for small eye movements is exemplified in more detail below with reference to FIG. 6.

Thus, the eye projection system according to the present invention is generally configured to provide image projection with increased resolution to the foveal region of the retina, while providing image projection with relatively lower (e.g. normal) resolution to the parafoveal region surrounding the fovea. This enables the system to reduce complexity of image rendering/processing with respect to images of high resolution, while providing high resolution images to regions of the user's eye that will actually utilize the high resolution image and require it.

Figure 3:
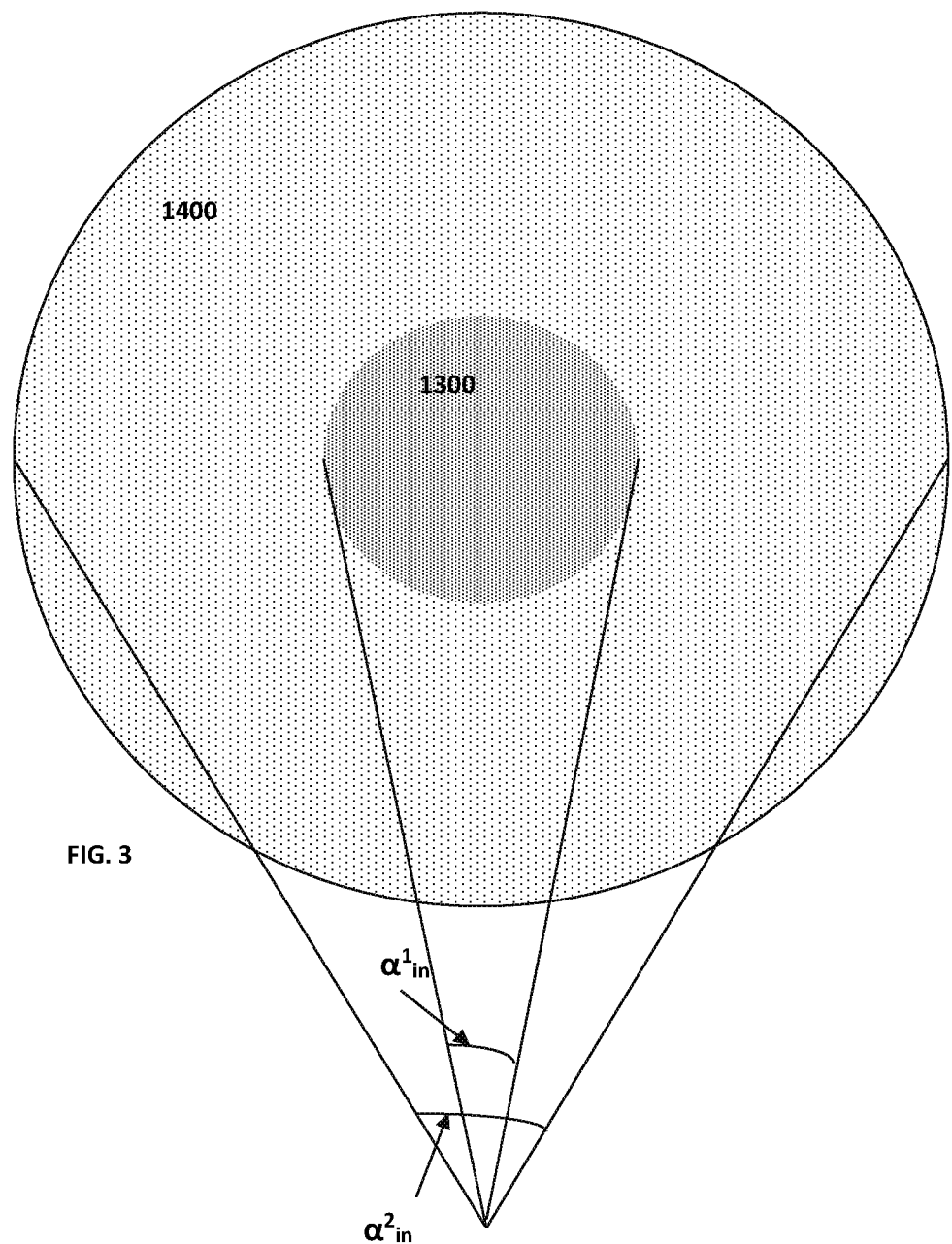
FIG. 3 illustrates schematically image arrangement generated according to the technique of the present invention.

FIG. 3 illustrates a two-portion image generated by the eye projection system of the invention. The complete image includes two image portions (generally at least two as the periphery image portion may be composed of several sub-images generated by several projection units) including the parafoveal/retinal image portion 1400 providing peripheral image data, which generally surrounds the center of attention; and the foveal image portion 1300 providing the main part of the image data and which corresponds to the center of attention of the user. The foveal image portion 1300 may typically be of higher resolution with respect to the parafoveal image portion 1400. The actual number of pixels of the foveal portion 1300 and the parafoveal portion 1400 may be the same or higher. The difference in image resolution may typically be provided due to a different area (field of view) covered by each image portion. Specifically, the foveal image portion may generally be projected to cover the actual area of the fovea, or a lightly larger area, which is significantly smaller with respect to the surrounding area of the retina. It should be noted that the image portions as shown in FIG. 3 exemplify a circular field of view. However, generally the field of view may be rectangular, oval or of any other shape. The foveal region 1300 of the projected image may preferably be of circular shape or oval so as to cover the field of view of the fovea and thus optimize the sharp vision abilities of this region of the eye. Also exemplified in FIG. 3 is an angular range of the foveal 1300 and parafoveal 1400 image portions at the user's pupil. Typically the angular range of the foveal image portion may be $\alpha^1_{in}$ and may be between 3° and 10°, and preferably about 5°. Additionally, the angular range of the parafoveal image portion at the pupil input may be higher than 20°, and typically about 120°-180°.

Figure 4:
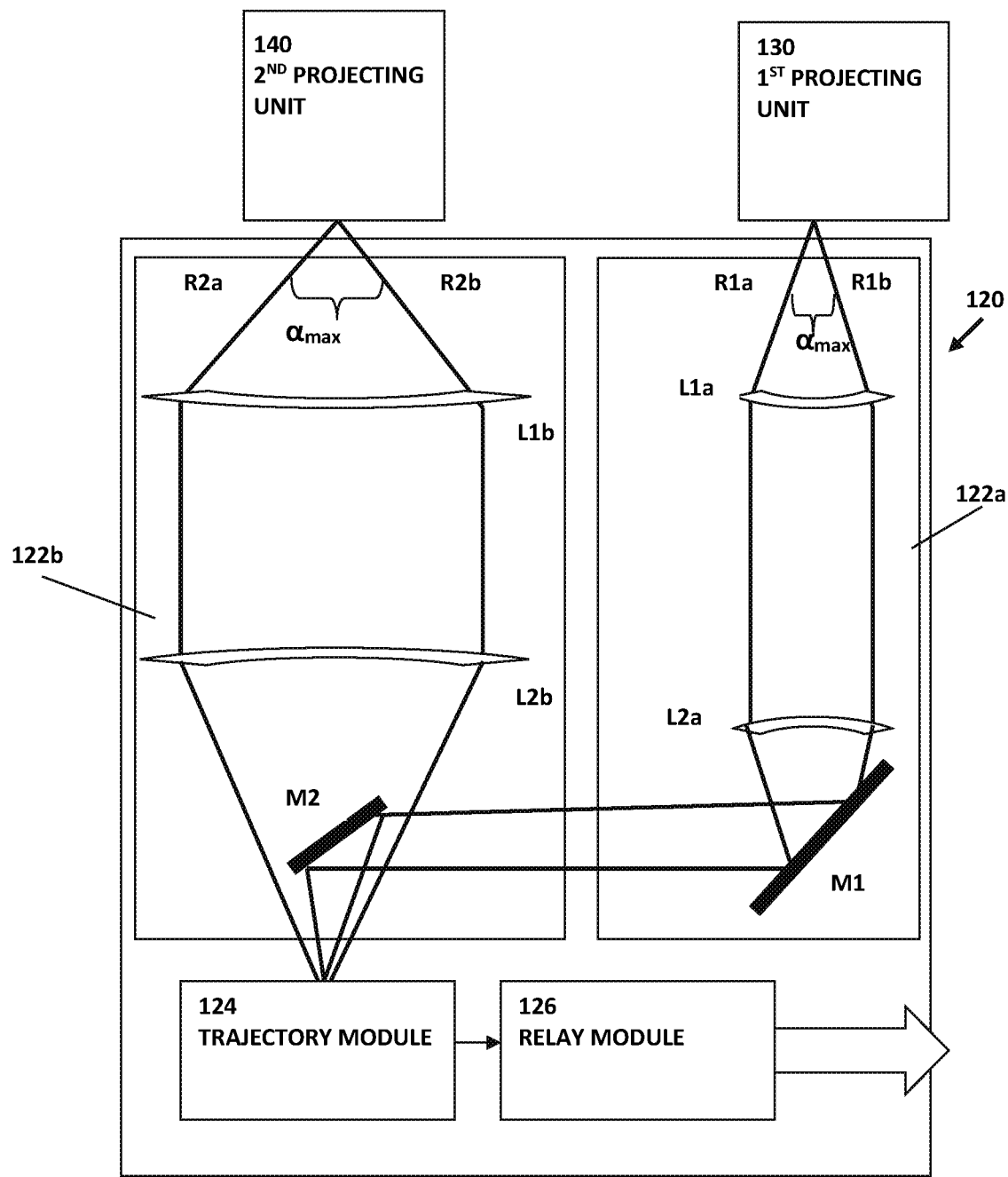
FIG. 4 shows a configuration of the eye projection system according to some embodiments of the present invention.
Figure 5:
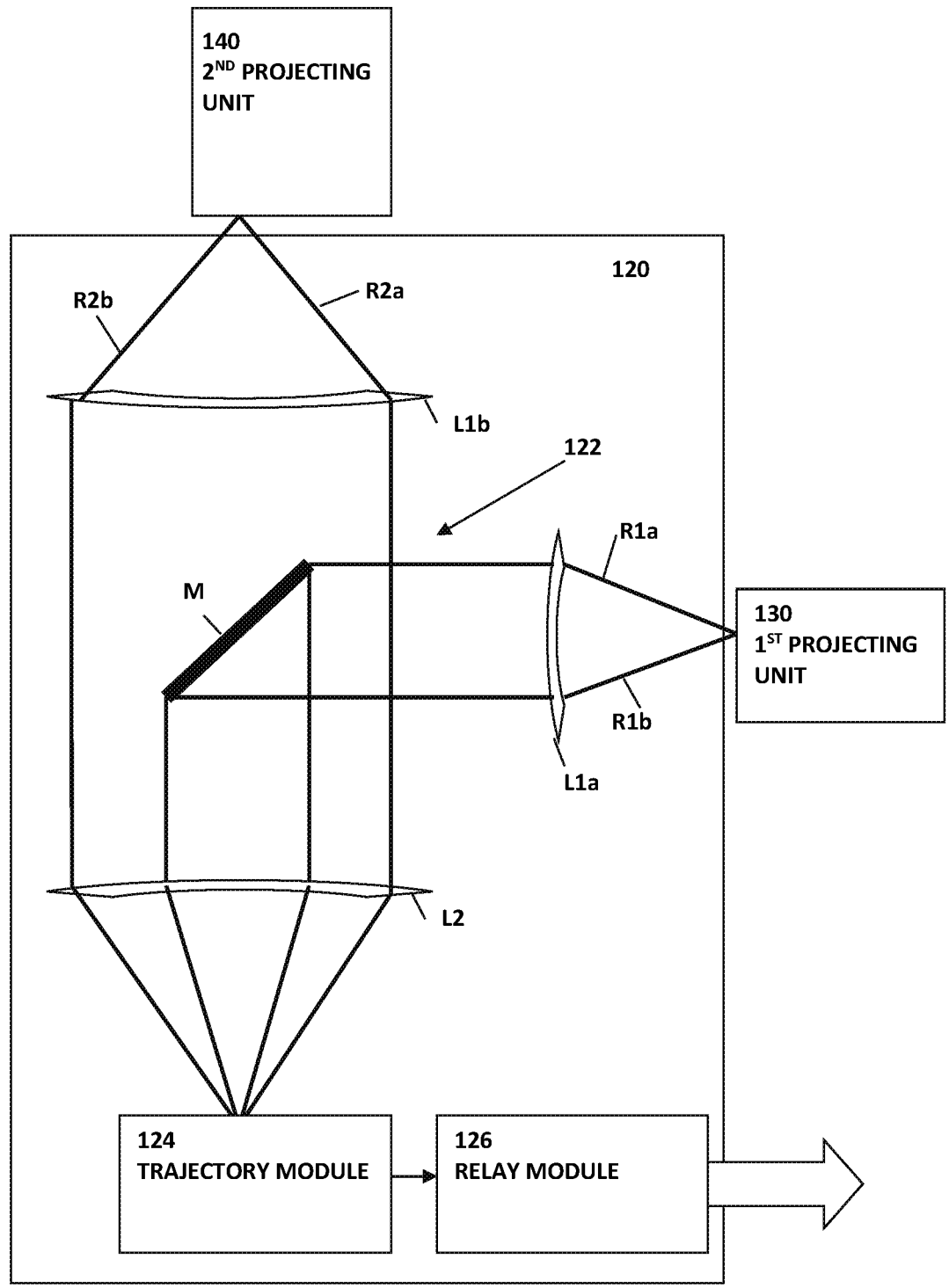
FIG. 5 shows one other configuration of the eye projection system according to some other embodiments of the present invention.

Referring to FIG. 4 and FIG. 5, two configurations of the eye projection system 100 are shown, exemplifying more specific configurations of the optical module 120 according to two exemplary embodiments of the invention. As shown in FIG. 4, the first 130 and second 140 projecting units are associated with corresponding initial relay modules 122a and 122b respectively. In the example of FIG. 5 the relay modules are combined to single relay module 122 including two (generally at least two) input lenses L1a and L1b and a single output lens L2. As shown in both the examples of FIG. 4 and FIG. 5, the optical system 120 may preferably include a combining module (M or M1 and M2), first 122 and second 126 relay modules and a tracking/trajectory module 124. In this connection, the first relay module, including separate relay modules as in FIG. 4 or a combined relay module as in FIG. 5, is configured to merge image projections generated by the first 130 and second 140 projecting units (or additional projecting units being merged in parallel or in cascade) such that each projecting unit transmits light to form an image portion (i.e. an optical field) in a corresponding region along a cross section perpendicular to the general direction of propagation of projected light. Additionally, FIG. 4 illustrates output angular range $\alpha_{max}$ of the first 130 and second 140 projecting units. As indicated, the first 130 and second 140 projecting units may or may not provide a similar output angular range. The optical system 120 is configured to adjust the angular range of each projecting unit as described in FIG. 3 above.

Referring to FIG. 4, each of the first 130 and second 140 projecting units outputs light indicative of an image or an image stream, marked in the figures by extreme light rays R1a, and R1b for the first projecting unit 130, and R2a and R2b for the second projecting unit 140. The output light from the first projecting unit 130 is transmitted into input lens of relay module 122a and is relayed onto trajectory module 124. More specifically, the light rays are output from the projecting unit such that different pixels, or different points on the projected image, are associated with corresponding different angles of light propagations. Thus the extreme light rays R1a and R1b correspond to two extreme points on the projected image. First lens L1a of the relay unit 122a refracts the light and directs it towards second lens L2a which re-focuses the input light onto the trajectory module 124. At the output of relay unit 122a, one or more beam combiners, M1 and M2 are located, as exemplified in the figure. The beam combiners M1 and M2 are configured to combine light projected by the first projecting unit into the optical path of light projected by the second projecting unit 140. Similarly, relay unit 122b typically includes first and second lenses L2a and L2b and is configured to relay light projection from the second projecting unit 140 in a substantially similar manner. Exemplary light rays R2a and R2b illustrate the extreme light rays of projection unit 140. Generally, the relay units 122a and 122b are configured with appropriately selected different optical powers of the lenses thereof and beam combiners M1 and M2 are located such that images projected by the first projecting unit 130 take a smaller area at a center of a region of image projection, surrounded by portions of images projected by the second projecting unit 140 as exemplified in FIG. 3. Further, it should be noted that generally both relay units 122a and 122b and the beam combiners M1 and M2 are configured to merge the image portions to form a common image plane (e.g. on the trajectory unit 124). This is to ensure common focusing of the user's eye.

It should be noted that the relay unit 122a (as well as any other relay unit such as 122b and 126, which is not specifically described here, may include additional lenses and are shown here as two-lens relay units for simplicity. It should also be noted that the optical parameters of the relay units are selected to provide proper imaging with desired resolution and sharpness as generally known and/or can be determined by standard optical design tools.

The projected images generated by the first and second projecting unit 130 and 140 are directed onto the trajectory module 124. The trajectory module 124 may include, for example, one or more moving light deflectors/mirrors (e.g. gaze tracking beam deflector and/or pupil position beam deflector as discussed above) configured to vary orientation thereof to direct light impinging thereon with a general optical path determined in accordance with tracking of eye movement. The trajectory module 124 and technique of eye tracking may be of any known configuration, and, as indicated above, an exemplary configuration is described in IL patent application No. 241033 assigned to the assignee of the present application.

As indicated above, FIG. 5 illustrates an additional configuration of the first relay module 122, configured to combine projected images from the first and second projecting units 130 and 140 within the relay module. The relay module 122 utilizes a common second lens L2 while utilizing separate first lenses L1a and L1b for the first 130 and second 140 projection units. As shown, the output from the second projecting unit 140 is relayed through lenses L1b and L2 onto trajectory module 124. Location and optical power of lenses L1b and L2 is selected to provide angular distribution of the projected light (exemplified by extreme light rays R2a and R2b) to provide desired angular resolution for peripheral vision of the user. Light output of the first projecting unit 130, exemplified by extreme light rays R1a and R1b, is collected by input lens L1a converting the diverging light to a set of parallel light rays propagating towards beam combiner M. The beam combiner M, which, as indicated above, may utilize a single surface (e.g. reflecting surface) or a plurality of surfaces, or may be configured as a partially reflecting surface (e.g. beam splitter type), is configured to direct output light of the first projecting unit 130 to propagate with and be located at the center of the cross section of light output from the second projecting unit 140. Generally beam combiner M may be configured to block light transmission from the second projecting unit 140, within the region at the center of the cross section of the field of view. However, in some configurations, the beam combiner M may be configured to partially transmit light passing therethrough, and thus allow at least a portion of light generated by the second projecting unit 140 to pass at the center of the field of view. In some further embodiments, beam combiner M may block at a central region and transmit at the periphery thereof, to allow smooth transition in image projection between the image generated by the first 130 and the second 140 projecting units. The combined projected light is further collected by second lens L2 and directed/focused onto the trajectory module 124.

In this connection it should be noted that the beam combining technique, i.e. utilizing one, two or more beam combiners as in FIGS. 4 and 5, may provide certain overlapping between image projection by the first projecting unit 130 (foveal image) and image projection by the second projecting unit 140 (parafoveal image). To this end the one or more beam combiners may be configured as beam splitting surfaces providing 50% reflection and 50% transmission of light, and/or as non uniform beam combiner surfaces having high transmission (reflection) at the periphery of the surface and high reflection (transmission) at the center of the surface. Thus, the transition between foveal image and parafoveal images may be made relatively smooth. It should also be noted that the graphic processing unit (GPU) may typically be configured to render the different image portions so as to provide smooth transition as described above. For example, the GPU may be configured to render images while adjusting image brightness at image portion boundaries to avoid sharp gradients resulting from image combining.

Generally, according to the present invention as described herein with reference to FIGS. 1, 4 and 5, the first and second projecting units, 130 and 140 may be any type of projecting unit, and may preferably be configured as scanning laser projecting units. Generally projection units of scanning laser type may provide greater efficiency with respect to light intensity, as well as in resolution of the projected images. Typically, the first and second projecting units 130 and 140 may be configured with similar specification, while providing projection of different image data sent for the control unit (200 in FIG. 1) or Graphic Processing Unit (GPU) thereof. Although the optical module is configured to combine image projection of the first and second projecting units (130 and 140) as generally exemplified in FIG. 3, the image data provided to the second projection unit 140 may be indicative of the complete image including the central (foveal) region, or it may include image data corresponding to a donut shaped image (i.e. peripheral image having a hole region where the image projected by the first projection unit 130 is combined).

As indicated above, the first and second projecting units (130 and 140) may preferably be scanning laser type projection units. In such projection units, a raster light deflector (moving mirror, e.g. utilizing MEMS) is configured to scan a laser beam within an angular scanning range (angular projection range) $\alpha_{max}$. The optical module 120 combines and directs the light of the at least first and second projecting units such that at the user's pupil, light generated by the first projecting unit has angular range $\alpha^1_{in}$ and light generated by the second projection unit has angular range $\alpha^2_{in}$ larger than $\alpha^1_{in}$. Effectively, different angles of light propagation at the user's pupil correspond to different points within the field of view. This is while angular resolution of light projection generally corresponds to resolution of the perceived image. The inventors have found that based on the anatomy of the human eye, input angular range of light projection by the first projection unit $\alpha^1_{in}$ is preferably configured to be within a range of about 3°. In some configurations, the optical module 120 and the relay module 126 thereof are configured to provide an angular range of about $\alpha^1_{in}=5°$ to ensure coverage of the foveal region within the retina. The angular range $\alpha^1_{in}$ is preferably determined in accordance with image resolution provided by the first projection unit 130 such that angular resolution at the input pupil of the user exceeds 2 arcminutes per pixel, and preferably exceeds 1 arcminute per pixel. Contrary to projection by the first projecting unit 130, light projection by the second projection unit 140 is generally configured to provide meaningful images within the periphery of the field of view. Thus, the angular range $\alpha^2_{in}$ associated with image projection by the second projecting unit 140 is preferably greater than 20°, and in some configurations may be greater than 70° to provide the user image projection with a wide field of view and provide a sense of presence within the projected image. The second projection unit 140 may provide a similar number of different angular points, such that the larger the angular range, the lower the angular resolution.

When scanning laser type projection units are used, the laser beam may generally include light beams from three or more laser units emitting three or more primary colors (e.g. red, green and blue) and is configured to vary intensity of each of the colors in accordance with the scanning orientation to provide imaging of a desired image data. The optical module 120 is configured to relay the light output from the first and second projection units such as to direct the projected light onto the user's eye. Generally the optical unit, and more specifically, the relay module 126 thereof is configured to direct the input light into the user's eye such that a cross section of the light, at the user's pupil (i.e. eye-box) has a diameter smaller with respect to the user's pupil. More specifically, the cross section diameter of light (e.g. full width, half max measure, or standard deviation measure) is smaller with respect to pupil diameter in strong lighting conditions. This is while the trajectory module 124 deflects the general optical path to vary location and angle of the eye-box (exit pupil of the system) in accordance with detected gaze direction (LOS) and/or location of the pupil (e.g. due to eye/LOS movement relative to the eye projection system 100). It should also be noted that output intensity of the projecting units, being scanning laser based on non laser or non scanning, and in some embodiments being spatial light modulator image projecting units (e.g. LCD based), is preferably sufficiently low, or is attenuated, to avoid damage and preferably avoid discomfort to the user.

In this connection it should be noted that the direct projection technique used by the optical module 120 according to the present invention provides for projecting images onto the eye retina, in a manner that the input light field propagates to an image plane on the retina. This is generally achieved regardless of focusing distance/configuration of the user's eye (which is generally controlled based on real or virtual distance to objects of interest) as the eye-box size, or cross section of the light field at the pupil, is generally smaller than pupil diameter. This provides image projection with enhanced depth of focus on the retina. Accordingly, the image is projected to be substantially focused on the retina, at substantially any focal state of the eye lens. For example, the image may be projected with substantial depth of focus allowing it to remain focused on the retina, while the eye lens is at any focal state within a wide focal length range from 4 meters to ∞.

Generally, according to some embodiments of the present invention, the eye projection system as exemplified in FIGS. 4 and 5, utilizes optical relay of the projected images into the user's eyes. In this connection, the technique of the present invention combines the projected images of the projection units (e.g. first and second projection units), and the combined light field passes through the trajectory module 124, tracking eye's movements, and are transmitted to the eye through relay module 126. Thus, the optical module 120 may be configured to optimize projection with respect to eyes' orientation, illumination conditions, image characteristics, user preferences etc. This is while the different image portions projection by the projection units are combined to direct image portions to the corresponding regions in the user's retina. As indicated above, in some embodiments of the invention, a first projection unit provides image projection directed towards the foveal region in the user's eye, while the second projection unit provides a surrounding image directed at the retina around the fovea. The projected images are combined using the one or more beam combiners and the first relay module(s). The latter is typically also configured to adjust spreading of the projected images such that the pixel density in the "foveal" image projected by the first projection unit is greater with respect to the pixel density in the surrounding "retinal" image projected by the second projection unit. Generally the foveal image is projected with resolution corresponding to 480p 720p, 1080p or higher onto an angular portion of the field of view of about 3° to 5° to each direction. The parafoveal/retinal image is projected with a substantially similar number of pixels; however the projected image is relayed to the user's eye such that it takes a predetermined part of the user's field of view, while leaving the central region, corresponding to the foveal image as shown in FIG. 3, with low projection intensity to thereby allow projection of the foveal image by the first projecting unit 130.

Figure 6:
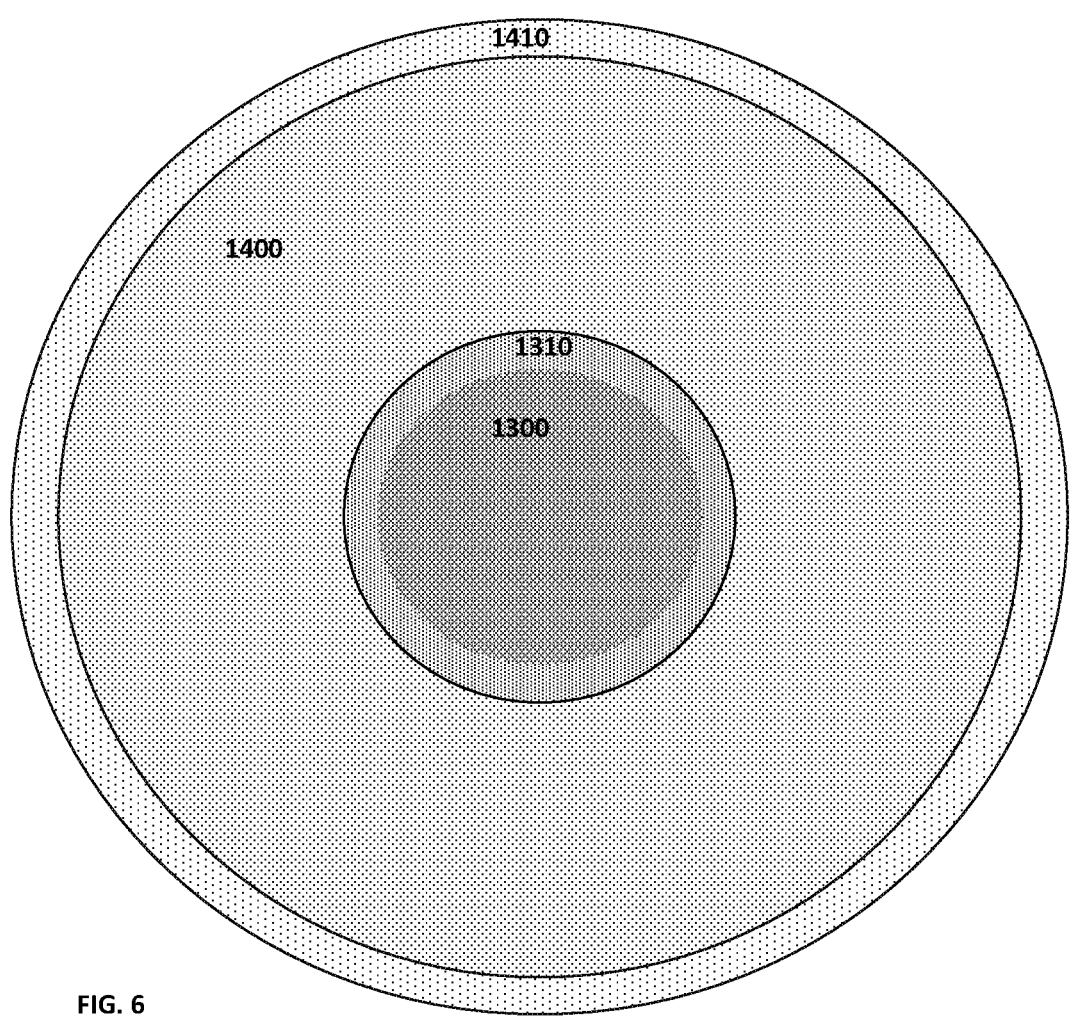
FIG. 6 illustrates some image rendering concepts used in the eye projection system according to some embodiments of the present invention.

Thus configuration of the optical module allows for adjustments of the exit pupil and of the general optical path in accordance with eye tracking and image characteristics. It should also be noted that by providing high resolution images directed at the fovea with lower resolution peripheral image data, the system may optimize the experience while reducing computation complexity. Further, in order to compensate for small eye movement, the Graphic Processing Unit (GPU) associated with the eye projection system, may be configured to render image data corresponding to a region that is slightly greater than the actual image data projected. Thus, the rendered image data exists and may be directly transmitted to the projection units based on the exact location of the eye at the time of projection. This is exemplified in FIG. 6 showing a rendered region of the foveal 1300 and retinal 1400 images. More specifically, while image data corresponding to regions 1300 and 1400 is projected into the user's eyes, the GPU processes image data which corresponds to the following frame. The GPU generated image data corresponds to regions 1310 and 1410, which are larger than regions 1300 and 1400. Regions 1310 and 1410 include image data that is generally outside of the field of view defined by image portions 1300 and 1400, referred to herein as shoulder image data. When, in the newly processed image, data is transmitted to the projection units (130 and 140), the control unit (200) indicates, using eye tracking technology, what is the exact location of the user's pupil, and the corresponding parts of the processed images are projected. This technique enables image variation compensating for small eye movements by providing already rendered shoulder image data pieces. In this connection, providing high resolution (i.e. below 4 arc-minute$^2$ of solid angle per pixel) to the foveal region of the user's eye in uniform resolution projection, requires generating image data having an extremely large amount of pixels (full hemisphere image with such spatial resolution requires almost 30 Mega pixels). The technique of the present invention allows for providing image projection with desirably high perceived angular resolution, while reducing the image resolution to regions of the eye that are less sensitive. Thus the foveal image utilizes high pixel density providing angular resolution of below 4 arcminutes per pixel, while the parafoveal image provides lower angular resolution (e.g. about 10 arcminutes per pixel). This allows the control unit and the GPU thereof to generate image data corresponding to lower resolution images, e.g. about 5 Mega pixels for foveal images and 5 Mega pixels for parafoveal images, providing a total rendered image data of about 10 Mega pixels.

Thus the present invention provides a system for image projection to a user's eye. The system is configured to reduce image rendering complexity and data transfer from a processing/rendering unit to the projection unit(s), while providing desirably high resolution images to the user. The system is generally configured to generate a combined image projection based on two or more image portions directed at corresponding portions of the user's retina, and is configured to optimally exploit the local sensitivity of the different regions of the retina. Those skilled in the art will readily appreciate that various modifications and changes can be applied to the embodiments of the invention as hereinbefore described without departing from its scope defined in and by the appended claims.

The invention claimed is:

1. A system for use in retinal image projection, comprising:
    at least first and second image projection units configured and operable for projection of at least first and second image portions respectively; and
    an eye projection optical module optically coupled to the at least first and second image projecting units; said eye projection optical module comprises:
    two initial relay modules associated with said first and second image projection units respectively for relaying light of said first and second image portions respectively, and a beam combiner configured and operable to combine optical paths of projection of said first and second image portions from and a beam combiner configured and operable to combine optical paths of projection of said first and second image portions from the at least first and second image projection units, along a general optical path, along which light beams of said first and a second image portions are to be directed to propagate towards a user's eye for projecting a combined image comprising said first and second image portions on the retina; and
    wherein the two initial relay modules include respective optical elements having different optical powers such that the first image portions projected by the first projecting unit occupy a smaller area in the combined image than the second image portions projected by the second projecting unit.

2. The system of claim 1 wherein said first and second image projection units and said eye projection optical module are configured and operable such that the first image portion, projected by the first image projection unit, is directed onto a first, central, region on a retina on the user's eye covering a foveal region of the retina, and the second image portion projected by the second image projection unit is directed onto a second, annular, region at the periphery of the retina covering at least a part of a parafoveal region of the retina.

3. The system of claim 2 wherein said first, and said second image projection units are configured to project the second image portion with an angular extent larger than an angular extent of the first image portion projected by the first image projection unit.

4. The system of claim 2, configured and operable such that a first and second optical fields generated by said first and second image projection units respectively are projected with respectively higher and lower image projection quality; and wherein said second optical field is projected onto a donut-shaped field of view for covering at least a part of the parafoveal region of the retina; and wherein said first and second optical fields overlap at a boundary region between said central and peripheral regions thereby providing projection of overlapping parts of the first and second image portions in the boundary region; and said first and second image portions are registered such that said overlapping parts of the first and second optical fields correspond to the similar image content.

5. The system of claim 1 wherein said first and second projection units are configured and operable to allow projection of image portions of relatively higher color depth on the foveal region of the retina and image portions of relatively lower color depth on peripheral regions of the retina.

6. The system of claim 5 wherein said first and second projection units are configured and operable to allow projection of image portions of relatively higher angular resolution on the foveal region of the retina and image portions of relatively lower angular resolution on peripheral regions of the retina.

7. The system of claim 1, wherein at least one of the first and second image projection units is a scanning based image projecting unit configured and operable for projecting images by scanning an image encoded light beam on the retina.

8. The system of claim 1, further comprising a control unit associated with an eye tracking module configured and operable for detecting changes in a gaze direction of the eye; and wherein said eye projection optical module comprises a trajectory module configured and operable for adjusting a general optical path of the image projection towards the eye; and said control unit is adapted to operate said trajectory module in accordance with detected changes in the gaze direction.

9. The system of claim 8 wherein the eye tracking module, configured and operable for detecting changes in a lateral location of a pupil of the eye relative of the system and said control unit, is adapted to operate said trajectory module in accordance with the detected changes in said lateral location of the pupil.

10. The system of claim 8 wherein the control unit is configured and operable for operating said trajectory module to compensate for said detected changes and thereby maintaining the combined image projected at a fixed location on the retina.

11. The system of claim 1, wherein said eye projection optical module is configured to direct the input light into the user's pupil with light field cross section being smaller with respect to the user's pupil.

12. The system of claim 11, wherein said eye projection optical module is configured for varying at least one of location and angle of the eye-box in accordance with data about gaze location of the user's pupil received from the eye tracking module, to thereby align said exit pupil with the optical axis of a user's eye.

13. The system of claim 1, comprising a control unit, configured and operable for obtaining imagery data indicative of a content of a combined image that should be projected to the user's eye, and segmenting said imagery data to said at least first and second image portions such that the first and second image portions are complementary image portions projectable by said first and second image projection units on to the central and periphery regions of the retina to thereby project said combined image on the retina.

14. The system of claim 1, wherein the optical projection module comprises an optical combining element configured to combine image projection of the first and second image projection units such that a first optical field generated by the first image projecting unit and associated with the projection of said first image portion propagates along a central region of a plane perpendicular to an optical axis of said optical projection module and second optical field generated by the second projecting unit propagates at a peripheral region of said plane with respect to said central region.

15. The system of claim 1, wherein each said at least first and second projecting units is configured to provide output light corresponding to image are projected with projection angle range $\alpha_{max}$, said optical projection module being configured to relay said output light towards a user's eye such that images projected by said first and second projecting unit enter said user's pupil at angular ranges $\alpha^1{}_{in}$ and $\alpha^2{}_{in}$ respectively, and $\alpha^2{}_{in} > \alpha^1{}_{in}$.

16. The system of claim 15, wherein $\alpha^2{}_{in}$ corresponds to an angular range of 3°.

17. The system of claim 15, wherein $\alpha^2{}_{in}$ corresponds to an angular range greater than 20°.

18. A head mounted display unit configured to provide at least one of virtual and augmented reality experience, comprising the system of claim 1.

19. The head mounted display unit of claim 18, wherein said eye projection optical module is adapted to direct images projected by the first and second projecting units to the user's eye while blocking surrounding ambient light.

20. The head mounted display unit of claim 18, wherein said eye projection optical module is adapted to direct images projected by the first and second projecting units to the user's eye while allowing transmission of surrounding ambient light, thereby providing a transparent display.

21. The system of claim 1 wherein the two initial relay modules are configured as two separate relay modules or as a combined relay module.

* * * * *